United States Patent
Park et al.

(10) Patent No.: US 9,477,031 B2
(45) Date of Patent: Oct. 25, 2016

(54) APPARATUS AND METHOD FOR MANUFACTURING LIGHT GUIDING PLATE

(71) Applicant: PSK INC., Gyeonggi-do (KR)

(72) Inventors: Kyoung Soo Park, Gyeonggi-do (KR); Sung Jae Lee, Gyeonggi-do (KR)

(73) Assignee: PSK Inc., Gyeonggi-Do (KR)

( * ) Notice: Subject to any disclaimer, the term of this patent is extended or adjusted under 35 U.S.C. 154(b) by 67 days.

(21) Appl. No.: 14/016,766

(22) Filed: Sep. 3, 2013

(65) Prior Publication Data

US 2014/0063854 A1   Mar. 6, 2014

(30) Foreign Application Priority Data

Sep. 4, 2012  (KR) .................. 10-2012-0097830

(51) Int. Cl.
| | | |
|---|---|---|
| *B05B 7/06* | (2006.01) | |
| *B05B 5/00* | (2006.01) | |
| *C23C 16/50* | (2006.01) | |
| *F21V 8/00* | (2006.01) | |

(52) U.S. Cl.
CPC ........... *G02B 6/0065* (2013.01); *G02B 6/0036* (2013.01)

(58) Field of Classification Search
USPC .............. 118/313–315, 641–643, 58, 62, 63, 118/325, 718, 723 R; 359/619, 811, 819; 264/1.38, 1.7; 347/37, 40; 427/162
See application file for complete search history.

(56) References Cited

U.S. PATENT DOCUMENTS

| | | | | |
|---|---|---|---|---|
| 2005/0057813 A1* | 3/2005 | Hasei et al. | ................... | 359/619 |
| 2006/0070701 A1* | 4/2006 | Kobayashi | ............ | A61F 13/514 |
| | | | | 156/277 |
| 2006/0275611 A1* | 12/2006 | Nishimura | ........... | B05D 3/0254 |
| | | | | 428/426 |
| 2009/0196998 A1* | 8/2009 | Nakagame | ............... | B05D 1/28 |
| | | | | 427/294 |
| 2009/0244713 A1* | 10/2009 | Kodera et al. | ................. | 359/619 |
| 2012/0195065 A1 | 8/2012 | Hyakuta et al. | | |

FOREIGN PATENT DOCUMENTS

| | | |
|---|---|---|
| CN | 102279431 A | 12/2011 |
| CN | 102628975 A | 8/2012 |
| JP | 2007105990 A | 4/2007 |
| JP | 2012160405 A | 8/2012 |

(Continued)

OTHER PUBLICATIONS

Taiwanese Search Report for Application No. 102131538 dated Dec. 15, 2014.

(Continued)

*Primary Examiner* — Yewebdar Tadesse
(74) *Attorney, Agent, or Firm* — Jenkins, Wilson, Taylor & Hunt, P.A.

(57) ABSTRACT

Provided is an apparatus for manufacturing a light guiding plate. The apparatus for manufacturing a light guiding plate includes an unwinding unit unwinding a film formed of a flexible material and wound in a roll shape, a winding unit winding the film provided from the unwinding unit in a roll shape, a surface treatment unit disposed between the unwinding unit and the winding unit to treat a surface of the film transferred into the winding part into a hydrophobic surface, a pattern formation unit disposed between the surface treatment unit and the winding unit to form a micro lens pattern on the surface of the film of which the surface is treated, and a pattern curing unit disposed between the pattern formation unit and the winding unit to cure the pattern.

6 Claims, 15 Drawing Sheets

(56) References Cited

FOREIGN PATENT DOCUMENTS

| | | |
|---|---|---|
| KR | 10 2011 0014430 | 2/2011 |
| KR | 10 2012 0097830 | 9/2012 |
| TW | 2006/22418 A | 7/2006 |
| TW | 2010/20113 A | 6/2010 |
| TW | 2012/17153 A | 5/2012 |
| TW | 2012/35718 A | 9/2012 |

OTHER PUBLICATIONS

Taiwanese Office Action for Application No. 102131538 dated Dec. 19, 2014.

* cited by examiner

APPARATUS AND METHOD FOR MANUFACTURING LIGHT GUIDING PLATE

CROSS-REFERENCE TO RELATED APPLICATIONS

This U.S. non-provisional patent application claims priority to and the benefit of Korean Patent Application No. 10-2012-0097830, filed on Sep. 4, 2012, the entire content of which is hereby incorporated by reference.

BACKGROUND

The present disclosure herein relates to an apparatus and method for manufacturing a light guiding plate, and more particularly, to an apparatus and method for manufacturing a light guiding plate for a backlight.

A light guiding plate is configured to uniformly supply light generated from a light generated from a light source to an entire surface of a display in a display device. Light having linear or point light distribution, which is incident from the light source, is converted into light having surface light distribution while passing through the light guiding plate, thereby providing the light having the surface light distribution to the display.

Recently, as a display device uses an ultra-thin display, a light guiding plate becomes thinner in thickness. Generally, light guiding plates are manufactured by using a mold. However, although the manufacturing method using the mold is inexpensive and easily mass-produced, if thin light guiding plates are required due to trend of lightweight, slimness, and compactness, it may be difficult to manufacture the thin light guiding plates. Thus, new methods for manufacturing thin light guiding plates are needed.

SUMMARY

The present disclosure provides an apparatus and method for manufacturing a light guiding plate, which are capable of reducing a process time and manufacturing costs.

The present disclosure also provides an apparatus and method for manufacturing a flexible light guiding plate.

The present disclosure also provides an apparatus and method for manufacturing a flexible light guiding plate through successive and continuous processes.

Embodiments of the inventive concept provide apparatuses for manufacturing a light guiding plate, the apparatuses including: an unwinding unit unwinding a film formed of a flexible material and wound in a roll shape; a winding unit winding the film provided from the unwinding unit in a roll shape; a surface treatment unit disposed between the unwinding unit and the winding unit to treat a surface of the film transferred into the winding unit into a hydrophobic surface; a pattern formation unit disposed between the surface treatment unit and the winding unit to form a micro lens pattern on the surface of the film of which the surface is treated; and a pattern curing unit disposed between the pattern formation unit and the winding unit to cure the pattern.

In some embodiments, the surface treatment unit may include a plasma supply part exciting a source gas into a plasma state to supply the excited source gas onto the film.

In other embodiments, the surface treatment unit may include a surface treatment nozzle applying a film formed of a hydrophobic material on the surface of the film.

In still other embodiments, the pattern formation unit may include a liquid drop discharge nozzle discharging a liquid drop of a light-transmissive UV-curable resin onto the surface of the film in an ink-jet method.

In even other embodiments, the pattern curing unit may include a heater part applying heat to the film.

In yet other embodiments, the pattern formation unit may discharge a light-transmissive curable resin liquid drop onto the surface of the film in an ink-jet method to form a micro lens pattern.

In further embodiments, the curable resin may include a UV-curable resin, and the pattern curing unit may include a light source part irradiating UV light onto the film.

In still further embodiments, the surface treatment unit, the pattern formation unit, and the pattern curing unit may be successively disposed along a transfer direction of the film.

In other embodiments of the inventive concept, apparatuses for manufacturing a light guiding plate: an unwinding unit unwinding a film formed of a flexible material and wound in a roll shape; a winding unit winding the film provided from the unwinding unit in a roll shape; a surface treatment unit disposed between the unwinding unit and the winding unit to treat a surface of the film transferred into the winding unit into a hydrophobic surface; a liquid drop discharge nozzle disposed between the surface treatment unit and the winding unit to discharge a liquid drop of a light-transmissive UV-curable resin onto the surface of the film of which the surface is treated, thereby forming a micro lens pattern; a heater part disposed between the liquid drop discharge nozzle and the winding unit to apply heat to the transferred film; and a light irradiating part disposed between the heater part and the winding unit to irradiate UV light onto the transfer film.

In some embodiments, the surface treatment unit may include: a housing disposed above a transfer path of the film, the housing having an inner space with an opened bottom surface; a gas supply part supplying a source gas into the housing; a plurality of first electrodes respectively inserted into rollers supporting the transferred film, the plurality of first electrodes being disposed parallel to each other; and a plurality of second electrodes disposed parallel to each other within the housing to excite the source gas staying in a space between the first electrodes and the second electrodes into a plasma state by a power applied from the outside.

In other embodiments, the surface treatment unit may include a surface treatment nozzle discharging a hydrophobic fluid onto the surface of the film.

In still other embodiments, the liquid drop discharge nozzle may include: a nozzle body having an accommodation part in which the curable resin is accommodated and a discharge hole connected to the accommodation part to discharge the curable resin liquid drop; and a piezoelectric element mounted within the nozzle body to vibrate the nozzle body by an electrical signal, thereby changing an inner pressure of the accommodation part.

In even other embodiments, a mark for informing a starting point of a unit light guiding plate may be displayed at a predetermined distance on the film, and the apparatus for manufacturing the light guiding plate may further include: a sensor disposed between the surface treatment unit and the nozzle body to detect the mark on the transfer film; and a control part receiving a detection signal of the mark from the sensor to control a discharge staring time of the liquid drop on the basis of the detection signal.

In yet other embodiments, the light irradiating part may include: a first light source disposed above a transfer path along which the film is transferred; and a second light source disposed under the transfer path, the apparatus for manufacturing the light guiding plate may further include a roller disposed between the first and second light sources to support the transferred film and formed of a transparent material.

In still other embodiments of the inventive concept, methods for manufacturing a light guiding plate include: unwinding a film formed of a flexible material and wound in a roll shape to transfer the film in one direction; treating a surface of the transferred film into a hydrophobic surface; discharging a light-transmissive UV-curable resin liquid drop onto the surface of the film in an ink-jet method to form a micro lens pattern; applying heat to the transferred film to primarily cure the pattern, and irradiating UV light onto the film to which the heat is applied to secondarily cure the pattern; and winding the film on which the pattern is cured in a roll shape.

In some embodiments, the treating of the surface of the film may include exciting a source gas containing an oxygen gas into a plasma state to supply the excited source gas onto the film.

In other embodiments, the forming of the micro lens pattern may be performed by discharging the light-transmissive curable resin liquid drop onto the surface of the film in the ink-jet method, and the curable resin may include a UV-curable resin.

In still other embodiments, a mark for informing a starting point of a unit light guiding plate may be displayed at a predetermined distance on the film, the pattern may be formed for the unit light guiding plate, and a discharge staring time of the liquid drop with respect to the unit light guiding plate may be calculated on the basis of a time point at which the mark is detected.

In even other embodiments, the liquid drop may be discharged several times onto the same area of the film to overlap each other.

In yet other embodiments, the primarily curing of the pattern may be performed by transferring heat into upper and lower portions of the film, and the secondarily curing of the pattern may be performed by irradiating the UV light onto the upper and lower portions of the film.

In even other embodiments of the inventive concept, methods for manufacturing a light guiding plate include: unwinding a film formed of a flexible material and wound in a roll shape to transfer the film; treating a surface of the transferred film into a hydrophobic surface; forming a micro lens pattern on the film of which the surface is treated; curing the micro lens pattern; and winding the cured film in a roll shape.

In some embodiments, the forming of the pattern may include discharging a light-transmissive UV-curable resin liquid drop onto the film in an ink-jet method to form the pattern.

In other embodiments, the treating of the surface of the film may include exciting a source gas containing an oxygen gas into a plasma state to supply the excited source gas onto the film.

In still other embodiments, the curing of the pattern may include providing heat into the film.

In even other embodiments, the treating of the surface, the forming of the pattern, and the curing of the pattern may be successively and continuously performed.

In yet other embodiments, the methods may further include cutting the film into a light guiding plate unit after the winding of the film.

In yet other embodiments of the inventive concept, light guiding plates are formed of a flexible material and manufactured by using the above-described methods.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE EMBODIMENTS

Figure 1:
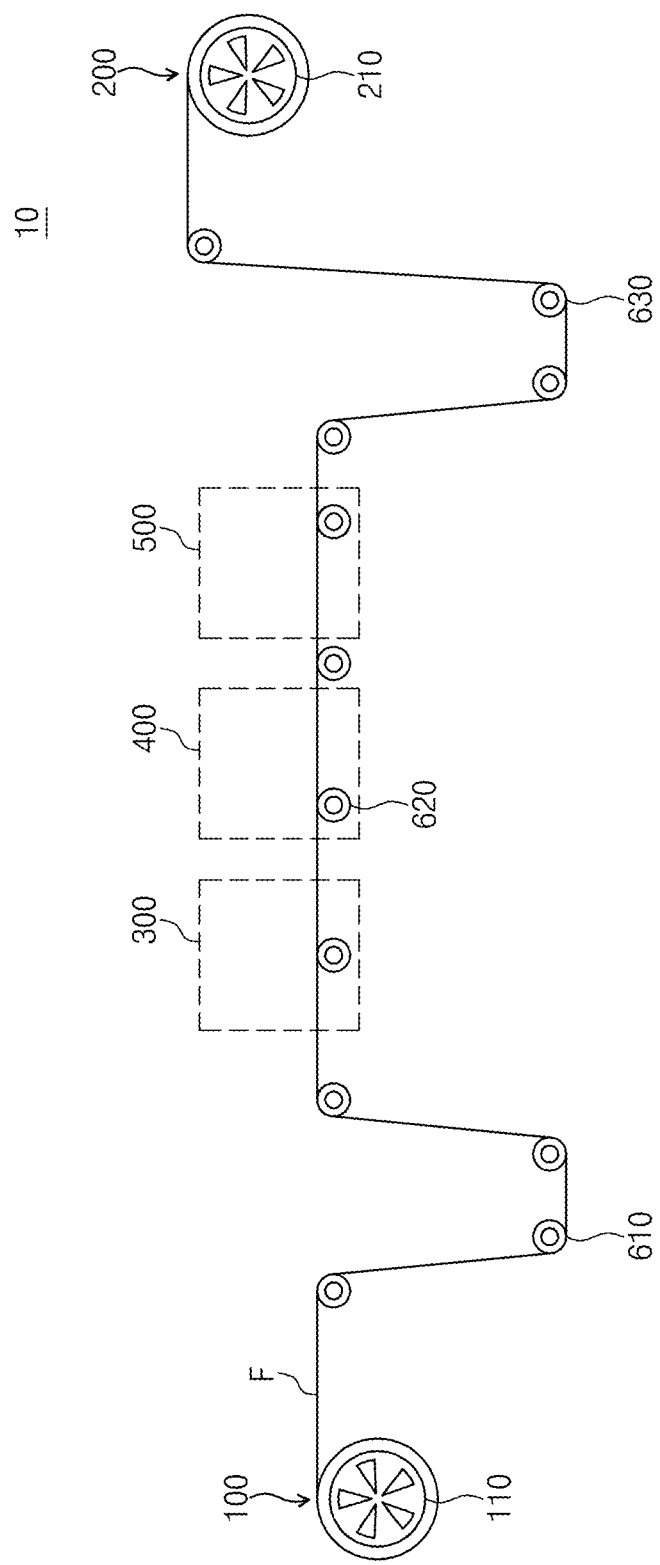
FIG. 1 is a schematic view of an apparatus for manufacturing a light guiding plate according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the present invention to those skilled in the art. In the drawings, the dimensions of layers and regions are exaggerated for clarity of illustration.

FIG. 1 is a schematic view of an apparatus for manufacturing a light guiding plate according to an embodiment of the inventive concept.

Referring to FIG. 1, an apparatus 10 for manufacturing a light guiding plate may manufacture the light guiding plate by treating a film F formed of a flexible material. The film F may be formed of a transparent synthetic resin through which light is capable of being transmitted. The transparent synthetic resin includes polymide, polyethylene terephthalate, polyehtylene naphthalate, polycarbonate, polystyrene, polyolefin, cellulose acetate, weather-resistant vinyl chloride, and UV-curable resin, electron beam-curable resin.

The apparatus 10 for manufacturing the light guiding plate includes an unwinding unit 100, a winding unit 200, a surface treatment unit 300, a pattern formation unit 400, and a pattern curing unit 500.

The unwinding unit 100 includes a reel 110 around which a film is wound in a roll shape. The unwinding unit 100 unwinds the film F wound around the reel 110.

The winding unit 200 is disposed spaced a predetermined distance from the unwinding unit 100. The winding unit 200 includes a reel 210 around which the film F unwound from the unwinding unit 100 is wound in a roll shape. The film F is continuously unwound from the unwinding unit 100, and then is wound around the winding unit 200 after the process is performed.

Guide rollers 610, 620, and 630 are disposed in a section in which the film F unwound from the unwinding unit 100 moves. The guide rollers 610, 620, and 630 guide the movement of the film F. That is, the guide rollers 610, 620, and 630 linearly move in one direction in a section between the surface treatment unit 300 and the pattern curing unit 500. The guide rollers 610, 620, and 630 are parallely spaced apart from each other in the section between the surface treatment unit 300 and the pattern curing unit 500 to support the film F transferred in one direction. The film F passing through the pattern curing unit 500 is converted in transfer direction by the guide roller 630 disposed between the pattern curing unit 500 and the winding unit 200 and then wound around the winding unit 200.

The surface treatment unit 300, the pattern formation unit 400, and the pattern curing unit 500 are successively disposed between the unwinding unit 100 and the winding unit 200 along the transfer direction of the film F.

The surface treatment unit 300 processes a surface of the film F into a hydrophobic surface, and the pattern formation unit 400 forms a micro lens pattern on the surface of the film F. The micro lens pattern represents a shape in which micro lenses are arranged. The pattern curing unit 500 cures the micro lens pattern formed on the surface of the film F. Hereinafter, each part will be described in detail.

Figure 2:
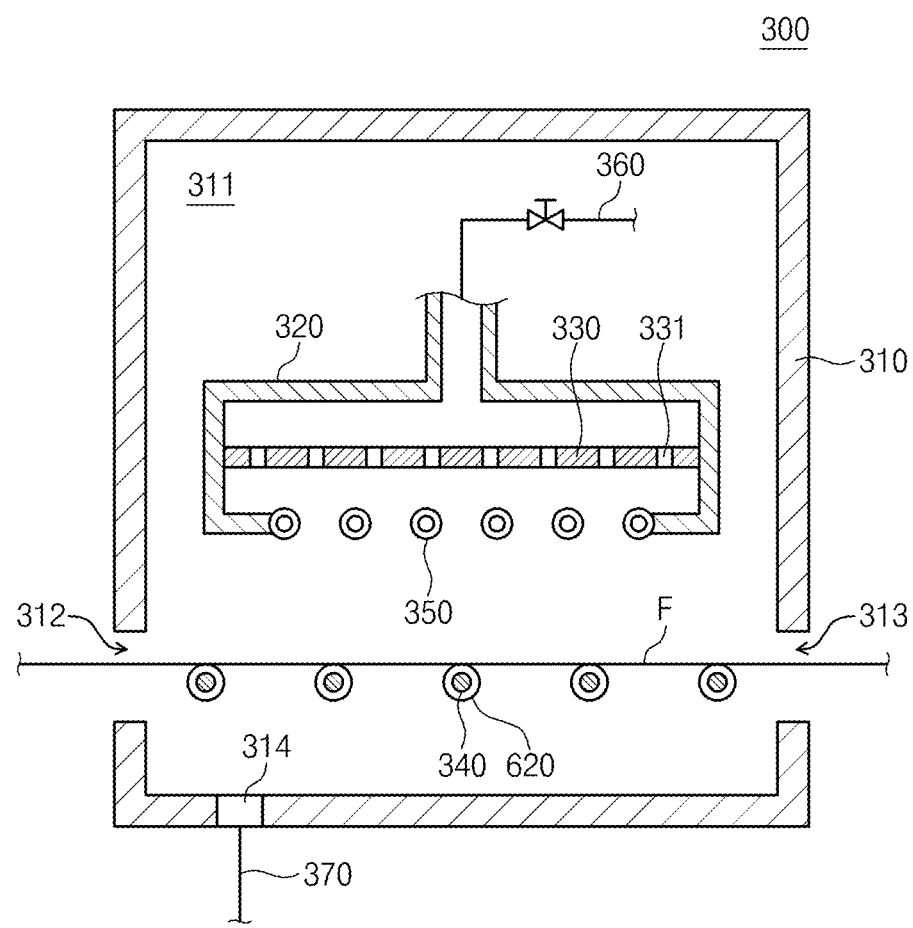
FIG. 2 is a view of a surface treatment unit according to an embodiment of the inventive concept.

FIG. 2 is a view of a surface treatment unit according to an embodiment of the inventive concept.

Referring to FIG. 2, the surface treatment unit 300 supplies a plasma gas onto the film F to treat the surface of the film F. The surface treatment unit 300 includes a chamber 310, a housing 320, a distribution plate 330, a first electrode 340, a second electrode 350, a gas supply part 360, and an exhaust member 370.

The chamber 310 is disposed in a transfer path of the film F and has an inner space 311. First and second openings 312 and 313 are defined in both sidewalls of the chamber 310. The first opening 312 is defined in one sidewall of the chamber 310 adjacent to the unwinding unit 100, and the second opening 313 is defined in one sidewall of the chamber 310 adjacent to the pattern formation unit 400. The first and second openings 312 and 313 are defined at the same height as that of the transfer path of the film F. The film F is taken into the chamber 310 through the first opening 312 and taken out of the outside of the chamber 310 through the second opening 313.

The housing 320 is disposed inside the chamber 310. The housing 320 is disposed above the transfer path of the film F. The housing 320 has an opened bottom surface and an inner space. The distribution plate 330 and the second electrode 350 are disposed within the housing 320.

The distribution plate 330 may be a plate having a thin thickness, and distribution holes 331 are defined in the distribution plate 330. The distribution holes 331 are defined at a uniform distance and provide a passage through which a source gas supplied into the housing 310 passes. The source gas passing through the distribution holes 331 is uniformly supplied to the second electrode 350.

The second electrode 350 is disposed under the distribution plate 330. The second electrode 350 is provided in plurality. In this case, the plurality of second electrodes 350 are parallely spaced apart from each other. The second electrode 350 is electrically connected to an external power source (not shown).

The first electrode 340 is disposed under the transfer path of the film F. The first electrode 340 is provided in plurality. In this case, the plurality of first electrode 340 are disposed parallel to the second electrodes 350, respectively. The first electrode 340 may be electrically connected to an external power source (not shown). According to the current embodiment, the first electrodes 340 may be inserted into the guide rollers 610, 620, and 630, respectively. The guide rollers 610, 620, and 630 prevent the first electrodes 340 from being exposed to plasma.

The gas supply part 360 supplies the source gas into the housing 320. A mixed gas containing an oxygen gas may be provided as the source gas. The source gas supplied into the housing 320 passes through a space between the distribution holes 331 and the second electrodes 350 and then is supplied onto the film F.

When a power is applied to the first and second electrodes 340 and 350 from the external power source, an electric field is formed in a space between the first electrode 340 and the second electrode 350. The electric filed excites the source gas supplied onto the film F into a plasma state. The excited source gas treats the surface of the film F. The surface of the film F treated through the surface treatment has a hydrophobic property.

The exhaust member 370 is connected to an exhaust hole 314 defined in the chamber 310. The exhaust member 370 adjusts an inner pressure of the chamber 310 to exhaust a reaction gas staying in the chamber 310 to the outside. While the surface treatment of the film F is performed, the inside of the chamber 310 may be maintained at an atmospheric pressure or a pressure less than the atmospheric pressure.

The above-described surface treatment unit may be an example of a device for treating the surface of the film into the hydrophobic surface. The surface treatment unit may have a configuration different from that according to the foregoing embodiment.

Figure 3:
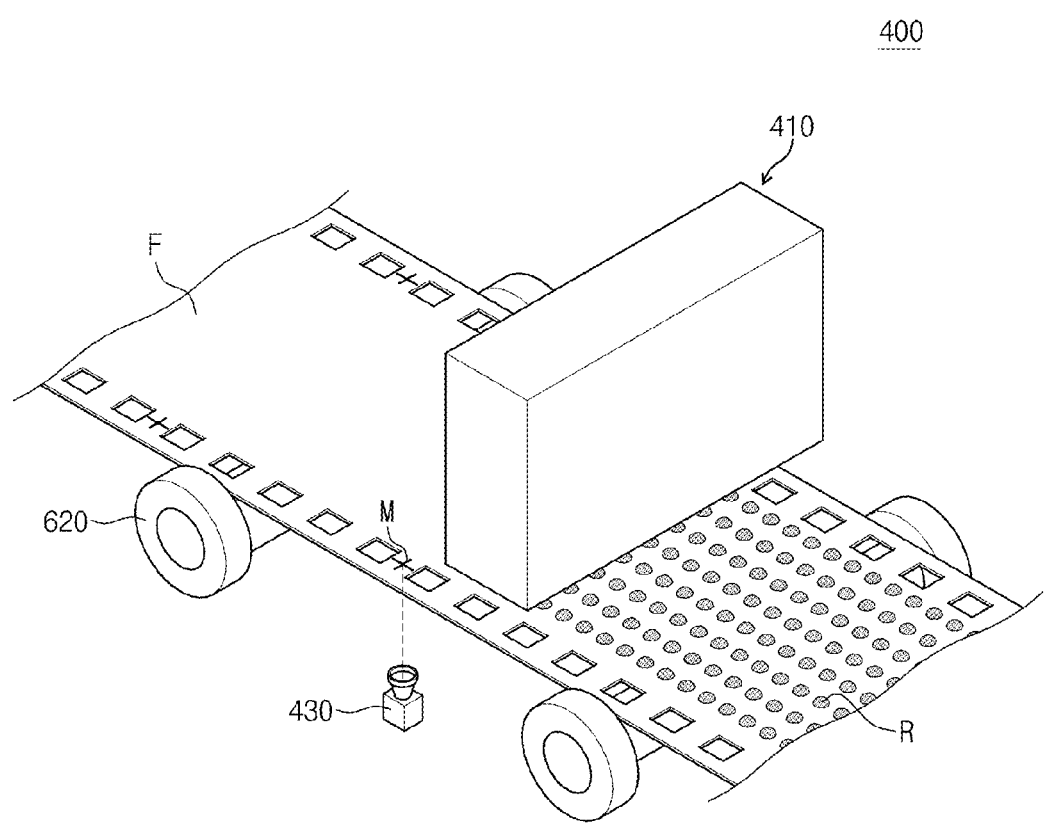
FIG. 3 is a perspective view of a pattern formation unit according to an embodiment of the inventive concept.
Figure 4:
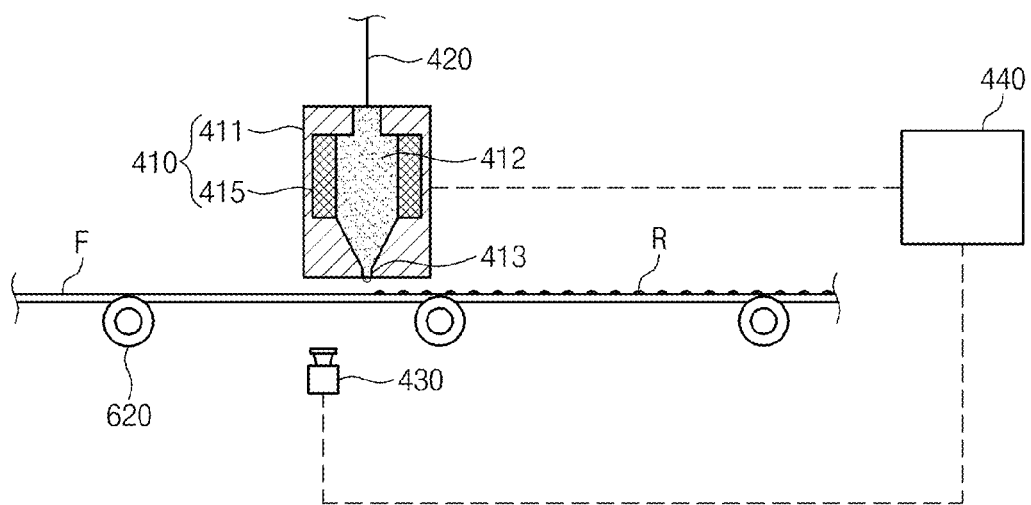
FIG. 4 is a schematic cross-sectional view of the pattern formation unit of FIG. 3.

FIG. 3 is a perspective view of the pattern formation unit according to an embodiment of the inventive concept, and FIG. 4 is a schematic cross-sectional view of the pattern formation unit of FIG. 3.

Referring to FIGS. 3 and 4, the pattern formation unit 400 discharges a light-transmissive curable resin (hereinafter, referred to as a "curable resin") liquid drop onto the surface of the film F in an ink-jet method to form a pattern of micro lenses R. The curable resin includes an UV-curable resin.

The pattern formation unit 400 includes a liquid drop discharge nozzle 410, a curable resin supply part 420, a sensor 430, and a control part 440.

The liquid drop discharge nozzle 410 is disposed above the transfer path of the film F to discharge a curable resin liquid drop D onto the film F. The liquid drop discharge nozzle 410 includes a nozzle body 411 and a piezoelectric element 415.

An accommodation part 412 and a discharge hole 413 are defined in the nozzle body 411. The accommodation part 412 is defined within the nozzle body 411 to accommodate the curable resin. The discharge hole 413 is defined in a bottom surface of the nozzle body 411 and connected to the accommodation part 412. The curable resin accommodated in the accommodation part 412 is discharged onto the film F through the discharge hole 413.

The piezoelectric element 415 is mounted on the nozzle body 411. The piezoelectric element 415 is provided in plurality. The plurality of piezoelectric element 415 may be disposed to face each other with the accommodation part 412 therebetween. The piezoelectric element 415 vibrates the nozzle body 411 by an electrical signal. A pressure within the accommodation part 412 may be changed by the vibration of the muzzle body 411. Thus, the curable resin liquid drop d may be formed on an end of the discharge hole 413 by the change in the pressure. The curable resin liquid drop d is discharged onto the film F. The curable resin liquid drop d may have a diameter of about several microns to about several ten microns. The curable resin liquid drop d discharged onto the film F forms the pattern of the micro lenses R. The pattern of the micro lenses R may have various shapes because the curable resin liquid drop d is discharged onto the surface of the film F and arranged in a dense or geometrical shape.

The curable resin supply part 420 is connected to the nozzle body 411 to supply the curable resin into the accommodation part 412.

The sensor 430 is disposed between the surface treatment unit 300 and the liquid drop discharge nozzle 410. The sensor 430 recognizes a mark M displayed on the transferred film F. The film F is cut into a plurality of pieces after the treatment process is performed. Then, the plurality of films F are provided onto the light guiding plate. The pattern of the micro lenses R may have the same shape for respective unit light guiding plates along a length direction of the film F. The mark M may be provided as a sign for informing a starting point of an area to be provided as the light guiding plate. The sensor 430 may be disposed under the transfer path of the film F to recognize the mark M. On the other hand, the sensor 430 may disposed above the transfer path of the film F to detect the mark M. The sensor 430 includes an optical sensor.

When the sensor 430 detects the mark M, a detection signal is transmitted into the control part 440. The control part 440 controls a discharge starting time of the curable resin liquid drop d on the basis of the detection signal. When the control part 440 receives the detection signal, it may be determined that a new pattern is formed on the unit light guiding plate. Also, the control part 440 may determines the discharge starting time of the curable resin liquid drop d in consideration of a transfer rate of the film F. Also, the control part 440 may control a discharge period of the curable resin liquid drop d according to a shape of the pattern of the micro lenses R formed on the film F.

Figure 5:
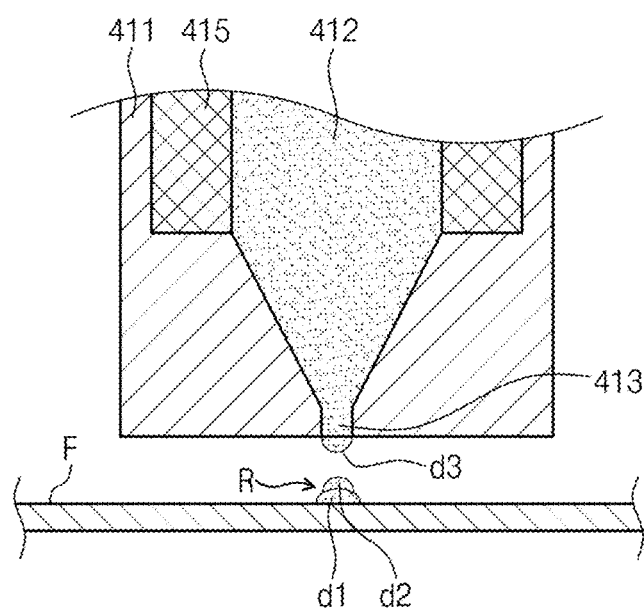
FIG. 5 is a view of a state in which curable resin liquid drops are discharged to overlap each other according to an embodiment of the inventive concept.

As shown in FIG. 5, the control part 440 may control the discharge period of the liquid drop d and the transfer rate of the film F so that the curable resin liquid drops d1 to d3 overlap each other in the same area of the film F. The primarily discharged curable resin liquid drop d1 is relatively widely spread on the surface of the film F and then is carbonized. The secondarily discharged curable resin liquid drop d2 is carbonized with a radius less than that of the primarily discharged curable resin liquid drop d1 on the primarily discharged curable resin liquid drop d1. Also, the tertiary discharged curable resin liquid drop d3 may be carbonized with a radius less than that of the secondarily discharged curable resin liquid drop d2 on the secondarily discharged curable resin liquid drop d2. As described above, since the curable resin liquid drops d1, d2, and d3 are discharged to overlap each other, each of the micro lenses R may have various shapes. The change in shape of the micro lens R may diversify light diffusing.

Figure 6:
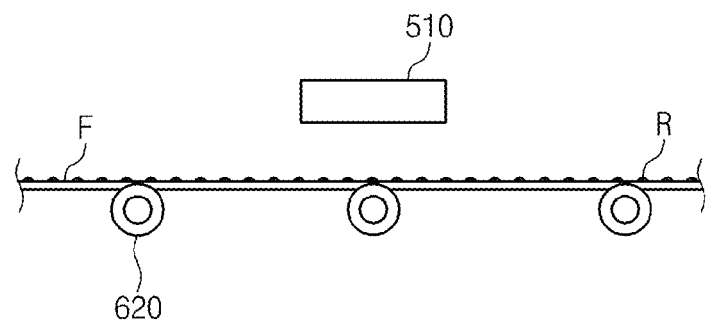
FIG. 6 is a view of a pattern curing unit according to an embodiment of the inventive concept.

FIG. 6 is a view of the pattern curing unit according to an embodiment of the inventive concept.

Referring to FIG. 6, the pattern curing unit 500 cures the micro lenses R formed on the surface of the film F. The pattern curing unit 500 includes a heater part 510. The heater part 510 is disposed above the transfer path of the film F to apply heat to the film F. The pattern of the micro lenses R is cured by the heat provided by the heater part 510.

Figure 7:
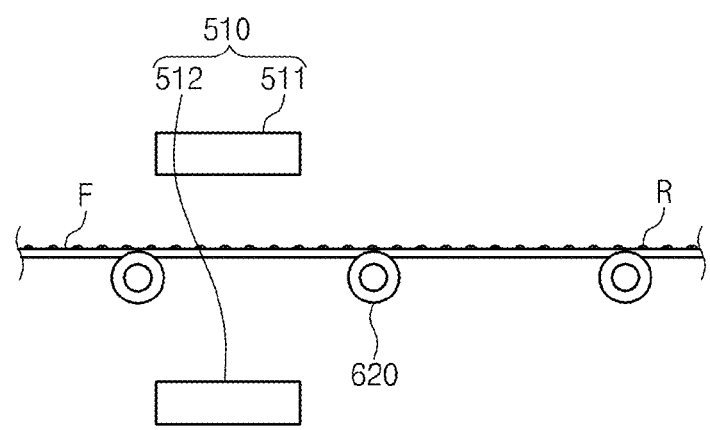
FIG. 7 is a view of a pattern curing unit according to another embodiment of the inventive concept.

FIG. 7 is a view of a pattern curing unit according to another embodiment of the inventive concept.

Referring to FIG. 7, the heater part 510 includes a first heater 511 and a second heater 512. The first heart 511 is disposed above a transfer path of a film F, and the second heater 512 is disposed under the transfer path of the film F. The first and second heaters 511 and 512 are disposed to face each other. Each of the first and second heaters 511 and 512 applies heat to the film F. A surface of the micro lens R is cured by the heat.

Figure 8:
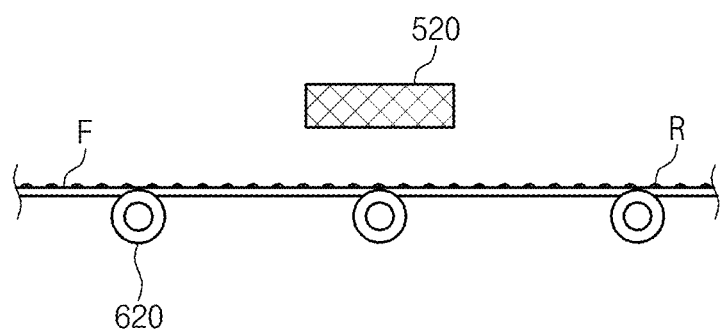
FIGS. 8 to 10 are views of a pattern curing unit according to another embodiment of the inventive concept.

FIG. 8 is a view of a pattern curing unit according to another embodiment of the inventive concept.

Referring to FIG. 8, a pattern curing unit 500 includes a light irradiating part 520. The light irradiating part 520 is disposed above the transfer path of the film F to irradiate light onto the film F. The light irradiating part 520 may irradiate UV light. The UV light may transmit the micro lenses R and then cure the micro lenses R. Here, the curable resin may be a UV-curable resin.

Figure 9:
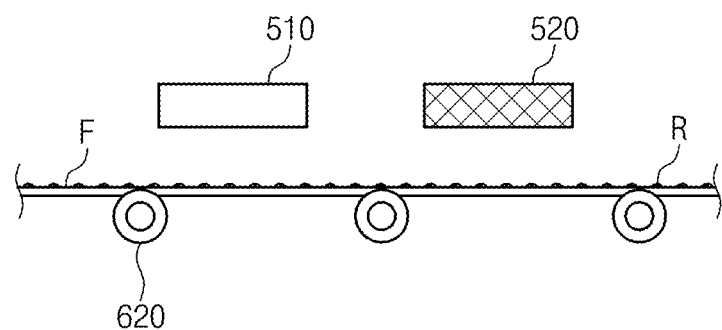

FIG. 9 is a view of a pattern curing unit according to another embodiment of the inventive concept.

Referring to FIG. 9, a pattern curing unit 500 includes a heater part 510 and a light irradiating part 520. The heater part 510 is disposed above the transfer path of the film F to apply heat to the film F. The pattern of the micro lenses R is primarily cured by heat. The heat cures a surface of each of the micro lenses R to maintain an initial shape of the lens R. The light irradiating part 520 is disposed between the heater part 510 and a winding unit 200 to irradiate light toward an upper portion of the transfer path of the film F. The light irradiating part 520 may irradiate UV light. The UV light may transmit the micro lens R and then cure the micro lens R. Here, the curable resin may be a UV-curable resin.

Figure 10:
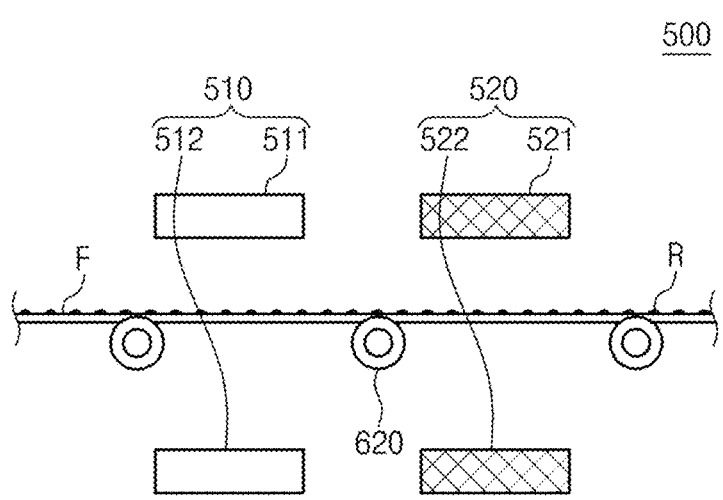

FIG. 10 is a view of a pattern curing unit according to another embodiment of the inventive concept.

Referring to FIG. 10, a pattern curing unit 500 includes a heater part 510 and a light irradiating part 520. The heater part 510 includes a first heater 511 and a second heater 512. The first heart 511 is disposed above a transfer path of a film F, and the second heater 512 is disposed under the transfer path of the film F. The first and second heaters 511 and 512 are disposed to face each other. Each of the first and second heaters 511 and 512 applies heat to the film F. A surface of the micro lens R is cured by the heat. The light irradiating part 520 includes a first light source 521 and a second light source 522. The first light source 521 is disposed above the transfer path of the film F, and the second light source 522 is disposed under the transfer path of the film F. The first and second light sources 521 and 522 are disposed to face each other. Each of the first and second light sources 521 and 522 irradiates UV light onto the film F. The UV light may transmit the micro lens R and then cure the micro lens R.

According to the current embodiment, a guide roller 620 supporting the transferred film F may be formed of a light-transmissive transparent material. The UV light irradiated from the second light source 522 transmits the guide roller 620 and is supplied onto the film F.

Hereinafter, a method for manufacturing the light guiding plate by using the above-described apparatus for manufacturing the light guiding plate will be described.

Figure 11:
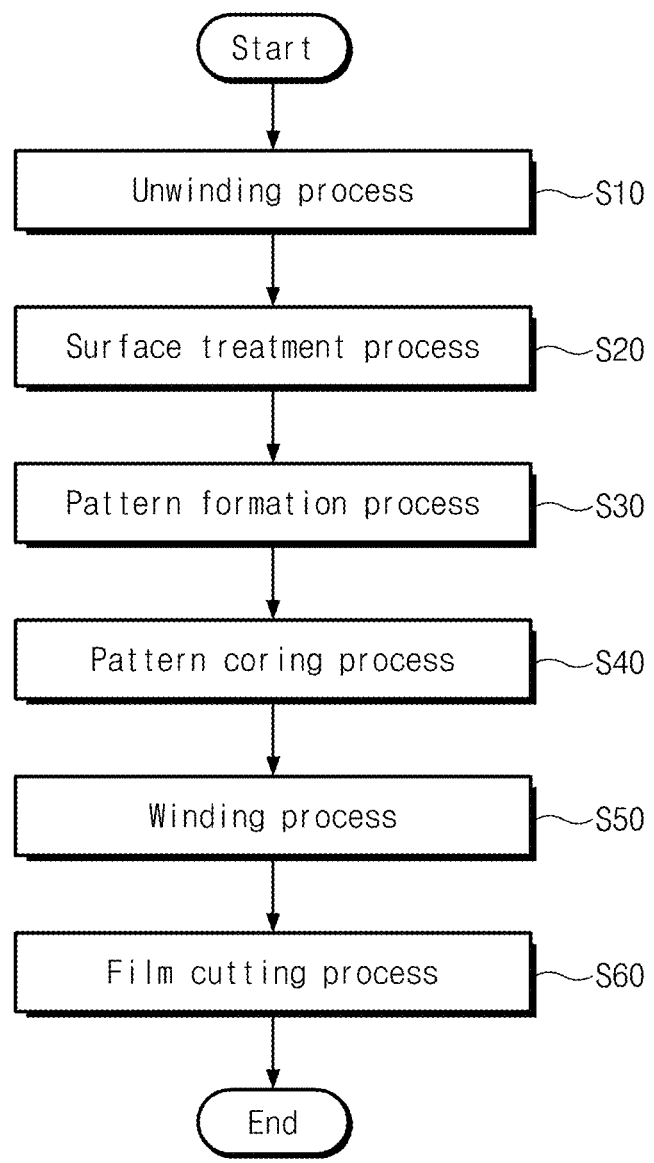
FIG. 11 is a flowchart illustrating a method for manufacturing a light guiding plate according to an embodiment of the inventive concept.

FIG. 11 is a flowchart illustrating a method for manufacturing a light guiding plate according to an embodiment of the inventive concept.

Referring to FIG. 11, a method for manufacturing a light guiding plate includes a winding process S10, a surface treatment process S20, a pattern formation process S30, a pattern curing process S40, a unwinding process S50, and a film cutting process S60. The winding process S10, the surface treatment process S20, the pattern formation process S30, the pattern curing process S40, are the unwinding process S50 are successively and continuously performed.

In the winding process S10, a film F wound around an unwinding unit 100 in a roll shape is unwound and then transferred in one direction. As shown in FIG. 1, a film F is changed in transfer direction by the guide roller 610. Also, the film F successively passes through the surface treatment unit 300, the pattern formation unit 400, and the pattern curing unit 500 and is transferred in one direction.

In the surface treatment process S20, a surface of the transferred film F is treated into a hydrophobic surface. According to the current embodiment, in the surface treatment process S20, a hydrophobic film is deposited on the surface of the film F by a chemical vapor deposition method or plasma chemical vapor deposition method. In the surface treatment process S20, a source gas is excited into a plasma state, and then, the excited source gas is supplied onto the film F to deposit the hydrophobic film on the surface of the film F. As shown in FIG. 2, the source gas supplied into the housing 320 from the gas supply part 360 is supplied onto the film F through a space between distribution holes 331 of a distribution plate 330 and a second electrode 350. When a power is applied to a first electrode 340 and the second electrode 350 from an external power source, an electric field is formed in a space between the first electrode 340 and the second electrode 350. The electric filed excites the source gas supplied onto the film F into a plasma state. The excited source gas is deposited on the surface of the film F.

In the pattern formation process S30, a pattern of a micro lens R is formed on the film F of which the surface is treated. As shown in FIG. 4, a sensor 430 detects a mark M formed on the transferred film F. When a mark detection signal is received into a control part 440, the control part 440 determines that transfer of an area to be provided as a single light guiding plate starts. The control part 440 controls a liquid drop discharge starting time of a liquid drop discharge nozzle 410 on the basis of the detection signal.

When an electrical signal is applied to a piezoelectric element 415 under the control of the control part 440, the piezoelectric element 415 vibrates a nozzle body 411. A pressure within an accommodation part 412 may be changed by the vibration of the muzzle body 411. Thus, the curable resin liquid drop d may be formed on an end of a discharge hole 413 by the change in the pressure.

The curable resin liquid drop d is discharged onto the surface of the film F. Since the surface of the film F has a hydrophobic property, the liquid drop d is carbonized on the surface of the film F without being excessively spread. The liquid drop d may be discharged and arranged in a dense or geometrical shape on each area.

According to the current embodiment, as shown in FIG. 5, the liquid drops d1, d2, and d3 may be disposed to overlap each other on the same area of the film F. The liquid drops d2 and d3 are carbonized on the previously discharged liquid drop d1. Since the liquid drops d1, d2, and d3 are discharged to overlap each other, the micro lens R may have various shapes. Also, the change in shape of the micro lens R may diversify light diffusing.

In the pattern curing process S40, a pattern of the micro lens R formed on the surface of the film F is cured. Referring to FIG. 6, the heater part 510 applies heat the transferred film F, and the light irradiating part 510 irradiates UV light. The surface of the lens R is cured by the heat and then completely cured by the UV light. Also, as shown in FIG. 10, the first and second heaters 511 and 512 may apply heat to upper and lower portions of the film F, and the first and second light sources 521 and 522 may irradiate the UV light on the upper and lower portions of the transferred film F. However, as described above, the pattern curing process S40 may be performed on only one of the heater part 510 or the light source part 520.

In the winding process S50, the film F of which the surface is completely cured is wound. The film F is wound around the winding unit 200 in a roll shape.

In the film cutting process S60, the film F wound around the winding unit 200 is cut by a light guiding plate unit. The cut film F is provided as a light guiding plate of a backlight unit. The light guiding plate may be formed of a flexible material and may be deformed in various shapes. The light guiding plate may be deformed in a plan or curved shape. Even if the light guiding plate has the curved shape, the light guiding plate may have desired light distribution. Also, since the light guiding plate is deformed in various shapes, the light guiding plate may be used for LED lighting devices having a flexible display and an irregular and solid structure.

Figure 12:
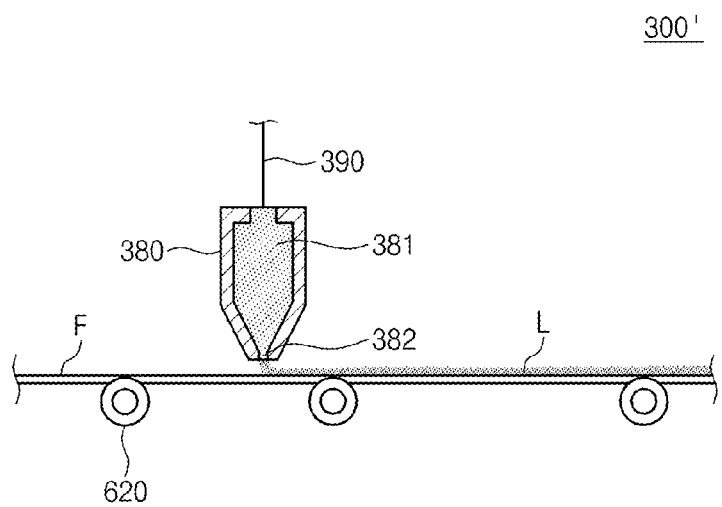
FIG. 12 is a view of a surface treatment unit according to another embodiment of the inventive concept.

FIG. 12 is a view of a surface treatment unit according to another embodiment of the inventive concept.

Referring to FIG. 12, a surface treatment unit 300' may apply a hydrophobic film L on a surface of a film F. The surface treatment unit 300' includes a surface treatment nozzle 380 and a fluid supply part 390.

The surface treatment nozzle 380 is disposed above a transfer path of the film F. The surface treatment nozzle 380 includes an accommodation part 381 and a discharge hole 382. The accommodation part 381 is disposed within the surface treatment nozzle 380 to provide a space in which a hydrophobic fluid temporarily stays. The discharge hole 382 is defined in a bottom surface of the surface treatment nozzle 380 and is connected to the accommodation part 381. The hydrophobic fluid is discharged onto the film F through the discharge hole 382.

The hydrophobic fluid, which is discharged from the surface treatment nozzle 380, is applied onto a surface of the film F. The surface of the film F may have the hydrophobic property by a hydrophobic fluid layer L.

According to the current embodiment of the invention concept, in the surface treatment process S20 for manufacturing the light guiding plate, the hydrophobic fluid is supplied onto the surface of the transferred film F to allow the surface of the film F to have the hydrophobic property.

Figure 13:
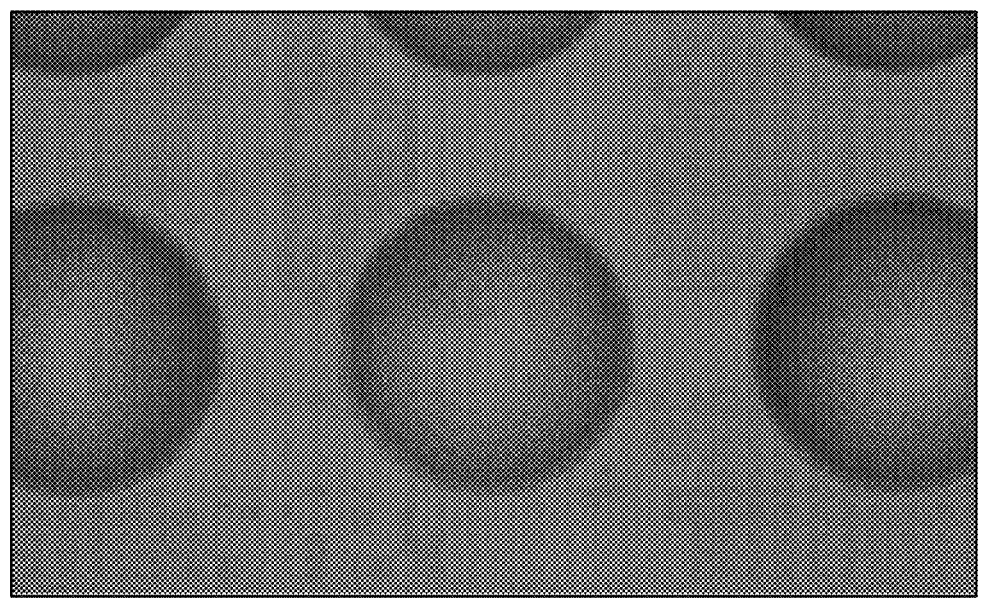
FIGS. 13 and 14 are photographs of a film on which micro lenses having various sizes and manufactured through the apparatus and method for manufacturing the light guiding plate are formed.
Figure 14:
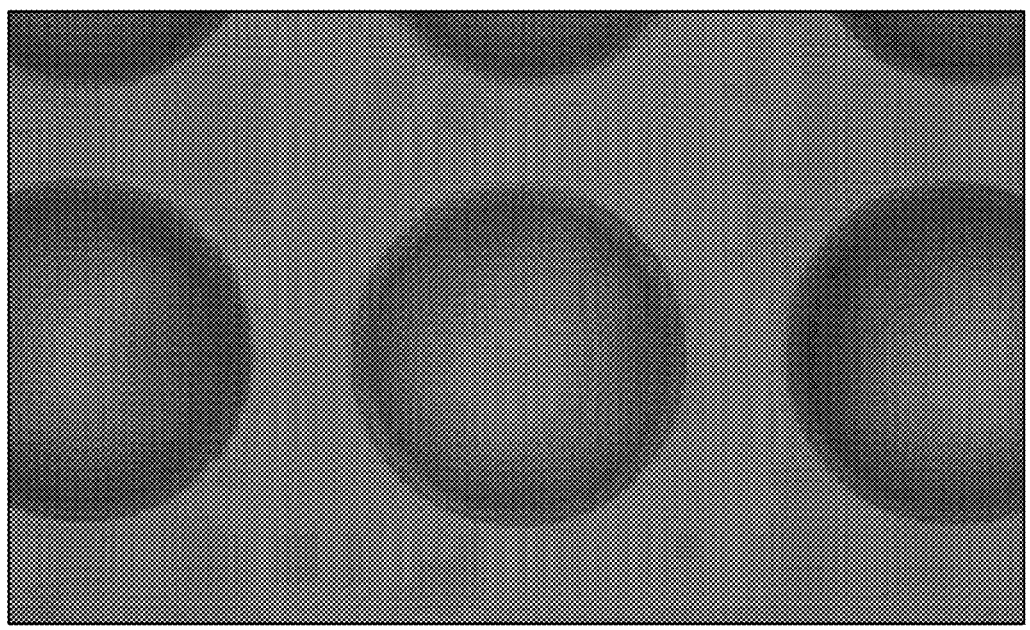

FIGS. 13 and 14 are photographs of a film F on which micro lenses R having various sizes and manufactured through the apparatus and method for manufacturing the light guiding plate are formed. FIG. 13 illustrates a film F on which a micro lens R having a diameter of about 40 micrometers is formed, and FIG. 14 illustrates a film F on which a micro lens R having a diameter of about 50 micrometers is formed.

Figure 15:
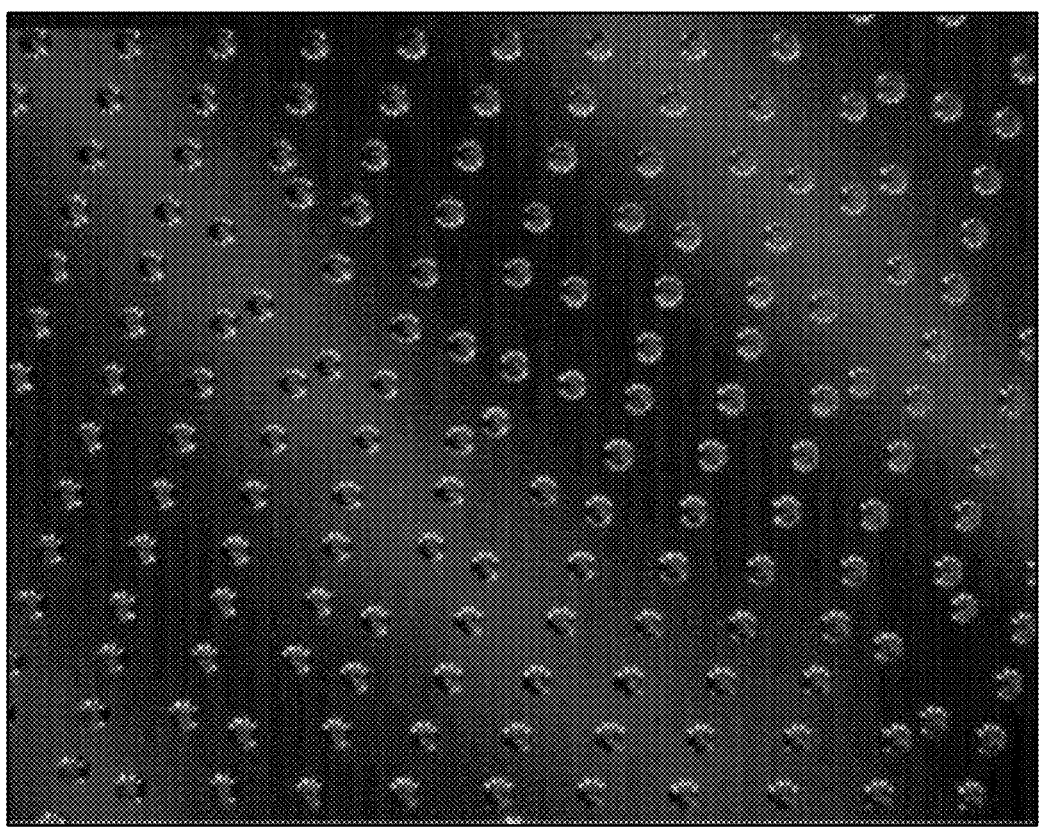
FIGS. 15 and 18 are photographs of the film on which the micro lenses manufactured through the apparatus and method for manufacturing the light guiding plate are arranged in various shapes.
Figure 16:
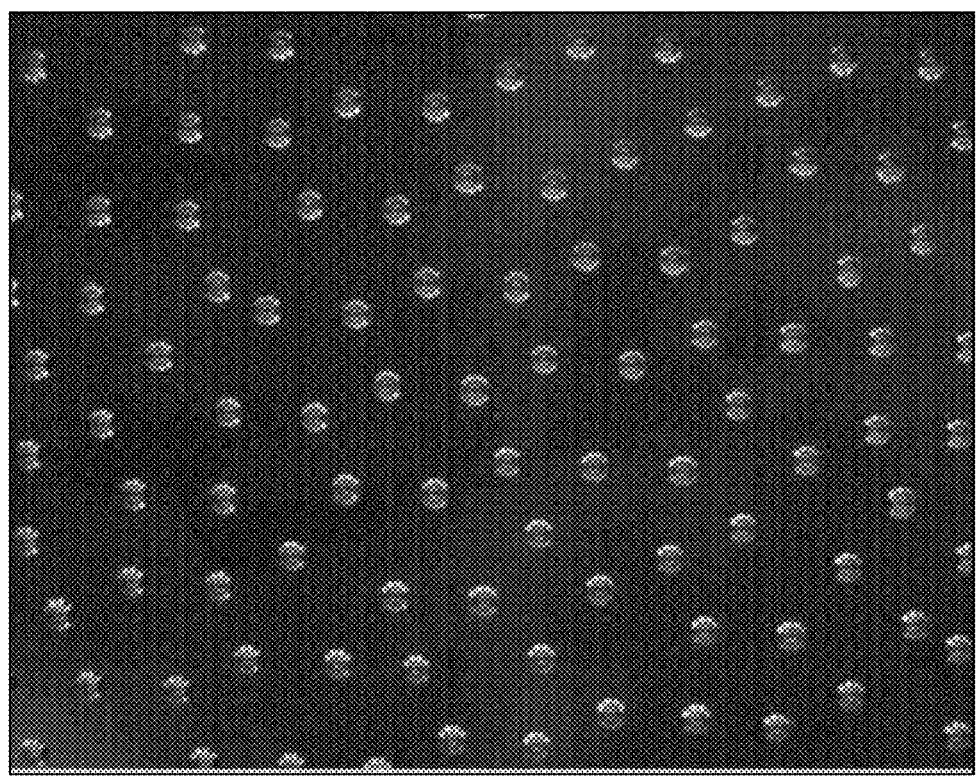
Figure 17:
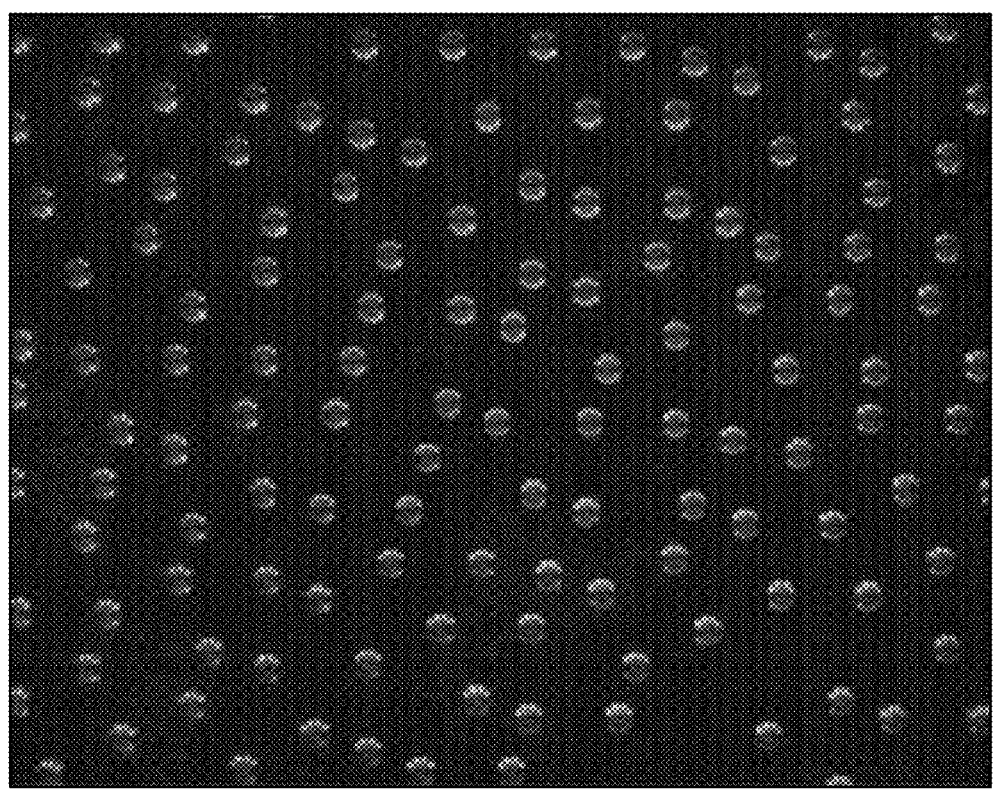
Figure 18:
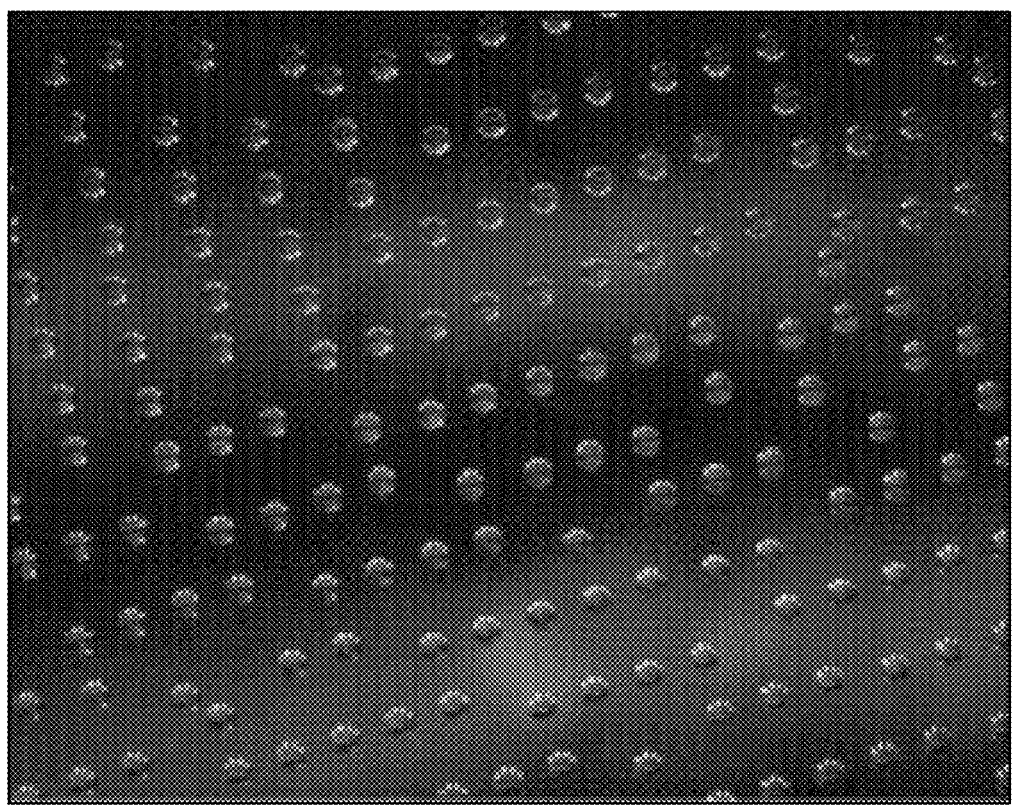

FIGS. 15 and 18 are photographs of the film on which the micro lenses manufactured through the apparatus and method for manufacturing the light guiding plate are arranged in various shapes.

According to the inventive concept, since the plurality of light guiding plates are cut from the film on which the micro lens pattern is formed, a time required for manufacturing the light guiding plate may be reduced, and manufacturing costs may be reduced.

Also, according to the inventive concept, since the light guiding plate is manufactured by using the film formed of a flexible material as a mother material, the flexible light guiding plate may be manufactured.

Also, according to the inventive concept, since the process for manufacturing the micro-printed pattern is completed while the film is transferred from the unwinding unit to the winding unit, the processes may be successively and continuously performed.

Also, according to the inventive concept, since the micro lens pattern is formed by using the ink-jet method, a time required for forming the pattern may be reduced.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for manufacturing a light guiding plate, the apparatus comprising:
    an unwinding unit unwinding a film formed of a flexible material and wound in a roll shape;
    a winding unit winding the film provided from the unwinding unit in a roll shape;
    a surface treatment unit disposed between the unwinding unit and the winding unit to treat a surface of the film transferred into the winding unit into a hydrophobic surface;
    a pattern formation unit disposed between the surface treatment unit and the winding unit, wherein the pattern formation unit comprises a liquid drop discharge nozzle configured to discharge a liquid drop onto the surface of the film to form a micro lens pattern on the surface of the film of which the surface is treated; and
    a pattern curing unit disposed between the pattern formation unit and the winding unit to cure the pattern comprising at least one heater part for applying heat to the film and at least one light source part irradiating UV light onto the film, wherein the at least one heater part is disposed before the at least one light source part along a transfer direction of the film, such that the pattern is first heated and then irradiated;
    wherein the surface treatment unit, the pattern formation unit, and the pattern curing unit are successively disposed along the transfer direction of the film.

2. The apparatus of claim 1, wherein the surface treatment unit comprises a plasma supply part exciting a source gas into a plasma state to supply the excited source gas onto the film.

3. The apparatus of claim 1, wherein the surface treatment unit comprises a surface treatment nozzle applying a film formed of a hydrophobic material on the surface of the film.

4. The apparatus of claim 1, wherein the liquid drop discharge nozzle is configured to discharged a liquid drop of a light-transmissive UV-curable resin onto the surface of the film in an ink-jet method.

5. The apparatus of claim 1, wherein the pattern formation unit discharges a light-transmissive curable resin liquid drop onto the surface of the film in an ink-jet method to form the micro lens pattern.

6. The apparatus of claim 5, wherein the curable resin comprises a UV-curable resin.

* * * * *

UNITED STATES PATENT AND TRADEMARK OFFICE
CERTIFICATE OF CORRECTION

PATENT NO.         : 9,477,031 B2
APPLICATION NO.    : 14/016766
DATED              : October 25, 2016
INVENTOR(S)        : Park et al.

Page 1 of 1

It is certified that error appears in the above-identified patent and that said Letters Patent is hereby corrected as shown below:

In the Claims

In Claim 4, Line 29, of Column 12 should read "... discharge nozzle is configured to discharge a liquid drop of ..."

Signed and Sealed this
Twenty-fifth Day of April, 2017

Michelle K. Lee
*Director of the United States Patent and Trademark Office*